US011873161B2

(12) United States Patent
Voznyuk et al.

(10) Patent No.: US 11,873,161 B2
(45) Date of Patent: Jan. 16, 2024

(54) WASTE RECEPTACLES

(71) Applicant: Rubbermaid Commercial Products LLC, Atlanta, GA (US)

(72) Inventors: Vadim Voznyuk, Charlotte, NC (US); Timothy Pierzynski, Apple Creek, OH (US)

(73) Assignee: Rubbermaid Commercial Products LLC, Atlanta, GA (US)

( * ) Notice: Subject to any disclaimer, the term of this patent is extended or adjusted under 35 U.S.C. 154(b) by 272 days.

(21) Appl. No.: 17/244,594

(22) Filed: Apr. 29, 2021

(65) Prior Publication Data

US 2021/0339946 A1 Nov. 4, 2021

Related U.S. Application Data

(60) Provisional application No. 63/018,227, filed on Apr. 30, 2020.

(51) Int. Cl.
*B65F 1/14* (2006.01)

(52) U.S. Cl.
CPC .......... *B65F 1/1473* (2013.01); *B65F 1/1452* (2013.01); *B65F 2220/12* (2013.01)

(58) Field of Classification Search
CPC ... B65F 1/1473; B65F 1/1452; B65F 2220/12
See application file for complete search history.

(56) References Cited

U.S. PATENT DOCUMENTS 2,302,570 A * 11/1942 Peterson ............. B60B 27/0026 301/128
2,578,629 A * 12/1951 Hartman ................... F16K 1/32 137/382
2,722,988 A * 11/1955 Kuhary ................. B60B 35/109 301/128
3,856,245 A * 12/1974 Byerly ...................... F16L 3/12 248/74.3
5,819,376 A * 10/1998 Kovalsky ................ F16L 33/03 24/23 R
6,247,500 B1 6/2001 McMahon
6,267,754 B1 7/2001 Peters
6,273,520 B1 8/2001 Liao
6,280,001 B1 8/2001 Parker et al.
6,328,320 B1 * 12/2001 Walski .................. B65F 1/1468 301/124.1
6,361,121 B1 3/2002 Morris
6,375,274 B1 4/2002 Morris
(Continued)

FOREIGN PATENT DOCUMENTS

CN 104728542 A * 6/2015 .............. F16L 23/06
EP 2062746 A1 5/2009

*Primary Examiner* — James A Shriver, II
*Assistant Examiner* — Michael T. Walsh
(74) *Attorney, Agent, or Firm* — Eversheds Sutherland (US) LLP

(57) ABSTRACT

A waste receptacle includes a housing, and a wheel assembly coupled to the housing. The wheel assembly includes an axle, a wheel secured to the axle and slidable along the axle between an outer position and an inner position, and a spacer. The spacer is removably securable to the axle adjacent the wheel in (i) a first position inward of the wheel to operably retain the wheel in the outer position, and (ii) in a second position outward of the wheel to operably retain the wheel in the inner position.

18 Claims, 5 Drawing Sheets

(56) References Cited

U.S. PATENT DOCUMENTS

| | | | | |
|---|---|---|---|---|
| 6,561,593 | B2 | 5/2003 | Godwin | |
| 6,666,526 | B1 | 12/2003 | Cummins | |
| 6,802,570 | B2 * | 10/2004 | McPherson | B60B 37/10 301/122 |
| 6,886,893 | B1 | 5/2005 | Fisch et al. | |
| 6,908,123 | B2 | 6/2005 | Le | |
| 6,910,742 | B2 | 6/2005 | Flood et al. | |
| 6,938,964 | B2 | 9/2005 | Flood et al. | |
| 7,070,246 | B2 | 7/2006 | Chen | |
| 7,111,851 | B2 | 9/2006 | Duncan | |
| 7,377,597 | B2 | 5/2008 | Morris | |
| 7,445,297 | B2 | 11/2008 | Mercier et al. | |
| 7,712,623 | B2 | 5/2010 | Wentz et al. | |
| 7,862,366 | B2 * | 1/2011 | Stone | H01R 13/5219 285/305 |
| 8,042,839 | B2 | 10/2011 | Rammhofer et al. | |
| 8,147,005 | B2 | 4/2012 | Morris | |
| 8,205,892 | B2 * | 6/2012 | Mackin | B62D 49/0678 180/209 |
| 8,444,228 | B2 | 5/2013 | Parker et al. | |
| 8,590,984 | B2 | 11/2013 | Morris et al. | |
| 8,746,388 | B2 | 6/2014 | Budweil | |
| 9,096,097 | B2 | 8/2015 | Trent, III et al. | |
| 9,127,795 | B2 | 9/2015 | Chan | |
| 9,352,782 | B2 | 5/2016 | Tollefsrud et al. | |
| 9,522,707 | B2 | 12/2016 | Kern | |
| 9,636,949 | B2 | 5/2017 | Jong | |
| 9,724,964 | B2 | 8/2017 | Morris et al. | |
| 9,834,037 | B2 * | 12/2017 | Carter | B60B 7/0013 |
| 9,849,927 | B2 | 12/2017 | Haefele | |
| 9,930,821 | B2 | 4/2018 | Clifford et al. | |
| 10,118,762 | B2 * | 11/2018 | Stark | B65F 1/02 |
| 10,202,203 | B2 * | 2/2019 | Skibba | B64D 37/32 |
| 10,451,200 | B2 | 10/2019 | Morton | |
| 2004/0108666 | A1 * | 6/2004 | Lauer | B65F 1/1468 280/33.998 |
| 2005/0179313 | A1 | 8/2005 | Liu | |
| 2006/0213572 | A1 | 9/2006 | Beaulieu | |
| 2009/0197690 | A1 * | 8/2009 | Lyscio | F16F 7/04 464/180 |
| 2015/0102600 | A1 * | 4/2015 | Schooley | F16L 23/06 285/409 |
| 2017/0059078 | A1 | 3/2017 | Ryan | |
| 2017/0305190 | A1 | 10/2017 | Abramov et al. | |
| 2017/0305482 | A1 | 10/2017 | Nabeck et al. | |
| 2019/0176518 | A1 | 6/2019 | Roach et al. | |
| 2019/0240091 | A1 | 8/2019 | Perkins | |
| 2020/0317363 | A1 * | 10/2020 | Hurley | F16L 3/137 |

* cited by examiner

WASTE RECEPTACLES

CROSS REFERENCE TO RELATED APPLICATIONS

This application claims priority to and the benefit of U.S. Provisional Patent Application No. 63/018,227, filed Apr. 30, 2020, which is incorporated herein by reference in its entirety.

BACKGROUND

1. Technical Field

The present disclosure relates generally to waste receptacles.

2. Description of the Related Art

Waste receptacles may be used for holding and disposal of a variety of material such as trash, recyclables, yard waste, industrial waste, commercial waste, or medical waste. A significant number of evolutions have occurred with waste receptacles, including residential and commercial waste receptacles. Large format waste receptacles are used to store and dispose relatively large volumes of waste. Such receptacles may be used street-side or for automated collection.

Large format waste receptacles may be mobile, for example, having wheels for moving waste receptacles between different locations.

SUMMARY

The present disclosure describes waste receptacles.

In embodiments, a waste receptacle includes a housing, and a wheel assembly coupled to the housing. The wheel assembly includes an axle, a wheel secured to the axle and slidable along the axle between an outer position and an inner position, and a spacer. The spacer is removably securable to the axle adjacent the wheel in (i) a first position inward of the wheel to operably retain the wheel in the outer position, and (ii) in a second position outward of the wheel to operably retain the wheel in the inner position.

Figure 1:
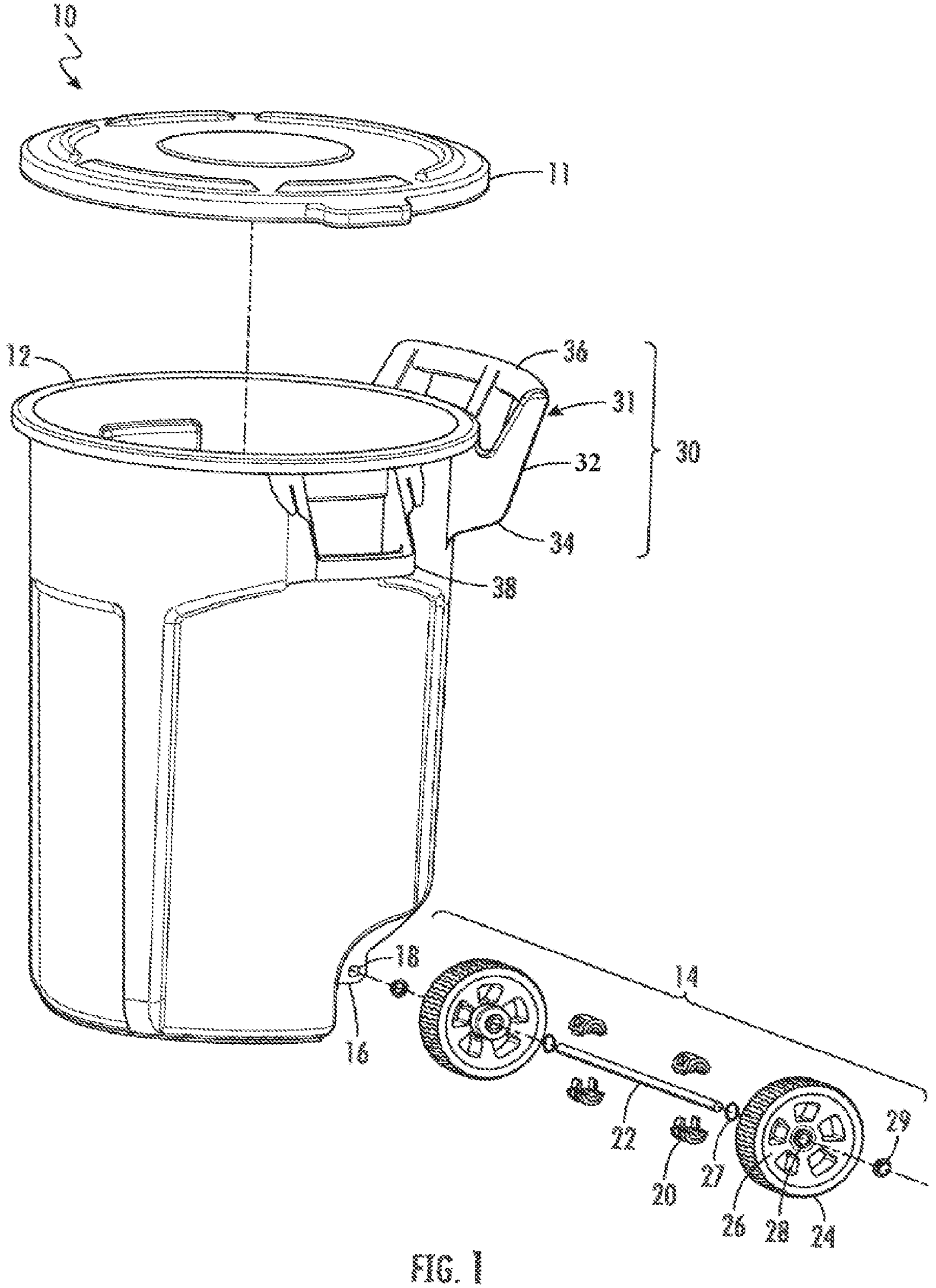
FIG. 1 is a conceptual exploded perspective view of a waste receptacle including a housing and a wheel assembly including a spacer.

It is to be understood that the invention is not limited in its application to the details of construction and the arrangement of components illustrated in the drawings or set forth in the following description.

DETAILED DESCRIPTION

The present disclosure describes waste receptacles. While waste receptacles of varying designs are available, waste receptacles present technical and ergonomic challenges. For example, wheels may be provided on waste receptacles for ease of mobility and transportation. However, the presence of wheels that protrude relative to the housing may deter efficient stacking or assembly during storage and transportation of multiple units. Further, providing a single narrow profile for the position of wheels may reduce stability, as wheels that are very narrowly placed may promote stacking, but may change the center of gravity or otherwise subject the waste receptacle to instability during use, such as to tipping. Waste receptacles according to the present disclosure may address one or more of these problems, as described elsewhere in the present disclosure.

In embodiments, a waste receptacle includes a housing, and a wheel assembly coupled to the housing. The wheel assembly includes an axle, a wheel secured to the axle and slidable along the axle between an outer position and an inner position, and a spacer. The spacer is removably securable to the axle adjacent the wheel in (i) a first position inward of the wheel to operably retain the wheel in the outer position, and (ii) in a second position outward of the wheel to operably retain the wheel in the inner position. For example, the waste receptacle can be stacked for storage or transportation with other receptacles, with the wheel in the inner position, which may promote compact stacking. When the wheel is in the inner position, the spacer is in the second position outward of the wheel, and operably retains the wheel in the inner position. For example, the spacer may prevent the wheel from sliding to the inner position. In some examples, the waste receptacle may be movable with the wheel in the inner position, because the wheel would still rotate about the axle in the inner position. Thus, the spacer may operably retain the wheel in the inner position.

For example, after the waste receptacle is removed, separated, or retrieved from a stacked assembly, the spacer may be removed to allow the wheel to be slid along the axle to the outer position. The spacer may then be secured to the axle in the first position inward of the wheel to operably retain the wheel in the outer position. The waste receptacle is movable with the wheel in the outer position, because the wheel would rotate about the axle in the outer position. The outer position of the wheel may provide greater stability in use, for example, while moving or orienting the waste receptacle.

While one wheel and one spacer are described with respect to embodiments of the present disclosure, it is to be understood that two or more wheels and spacers may be provided on the axle. Likewise, while one axle is described, multiple axles may also be provided. While one spacer is described with reference to one wheel, in some examples, the number of spacers may the same as, more than, or less than, the number of wheels. For example, one spacer may retain more than one wheels in a particular position. While inner and outer positions of wheels are described, one or more wheels may be retained at any desired suitable locations along the axle using one or more spacers according to the present disclosure.

Figure 2B:
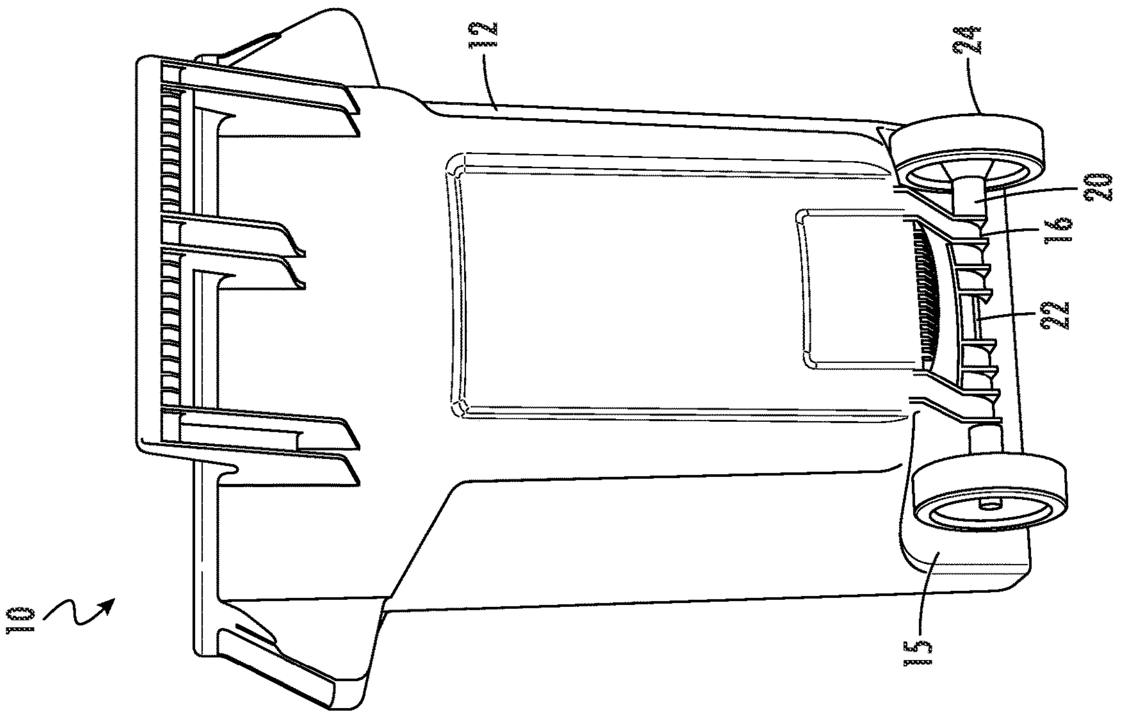
FIG. 2B is a rear view of the waste receptacle of FIG. 2A.
Figure 2A:
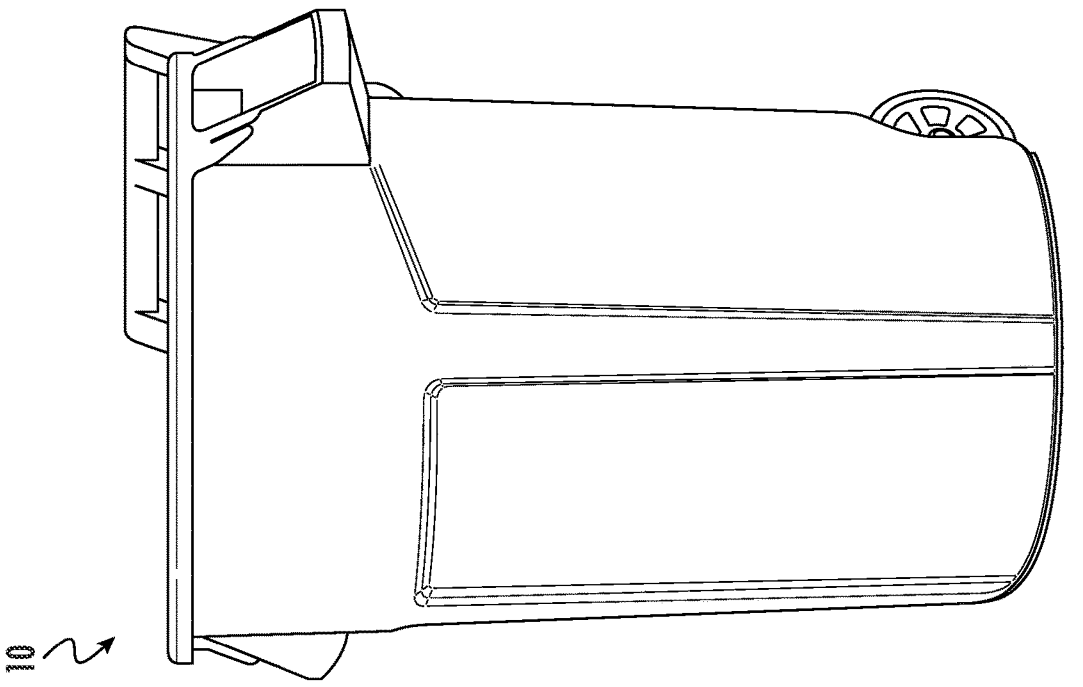
FIG. 2A is a front view of the waste receptacle of FIG. 1 with the spacer in a first position.

FIG. 1 is a conceptual exploded perspective view of a waste receptacle 10 including a housing 12 and a wheel assembly 14 including a spacer 20. FIG. 2A is a front view of waste receptacle 10 of FIG. 1 with spacer 20 in a first position. FIG. 2B is a rear view of waste receptacle 10 of FIG. 2A.

Housing 12 may be formed of any material suitable for holding or supporting waste. Housing 12 may be formed of one or more materials, or a composite material. In some embodiments, one or more materials forming housing 12 may include one or more of a metal, an alloy, a polymer, a glass, a ceramic, a fabric, a composite, or combinations thereof. The material may be rigid, semi-rigid, or flexible. In some embodiments, housing 12 is substantially rigid, for example, tending to maintain its shape and resist deformation.

Housing 12 may have any general shape, for example, cuboidal, rectangular cuboidal, cylindrical, curved, polygonal, or any other suitable shape. Housing 12 may include faces or walls that may be smoothly interconnected, or may intersect at vertexes or edges. In some embodiments, housing 12 may have substantially the same cross-sectional area along a height of the housing. In other embodiments, the cross-sectional area may vary, for example, continuously increase along a height, or decrease, or any other variation. Housing 12 may define at least one opening, for example, an upper opening, to receive a liner. In some embodiments, housing 12 may be open at one end and closed at another end.

Housing 12 may define a rim generally at a top or upper end of housing 12, for example, relative to the direction of gravity. The rim may be configured to receive a liner (not shown in FIG. 1A). The liner may be formed of one or more materials including a polymer, or any other suitable liner material. In some embodiments, the liner includes a reinforced material. The liner may be placed into housing 12 through an opening, and may be pushed, pulled, stretched, or otherwise disposed in housing 12, for example, being generally secured about or along the rim.

Wheel assembly 14 includes an axle 22, a wheel 24 secured to axle 22 and slidable along axle 22 between an outer position and an inner position, and spacer 20. Wheel assembly 14 is coupled to housing 12. For example, housing 12 may define a hub 16, and hub 16 may define an opening 18 configured to receive axle 22 to secure wheel assembly to housing 12. Hub 16 may be formed of the same material as housing 12, for example, being integral with housing 12, or may be formed separately from housing 12 with the same or different materials and secured to housing 12.

In embodiments, housing 12 may include multiple hubs with respective single or multiple openings, or a single hub with multiple openings, such that axle 22 passes through one or more openings. For example, housing 12 may include two or more hubs or openings, and axle 22 may pass through one or more of these openings. In some embodiments, the hubs and openings may be symmetrically provided along axle 22. Axle 22 may be formed of a metal, an alloy, or any other suitable rigid material.

As discussed elsewhere with reference to FIGS. 7A to 7D, spacer 20 is removably securable to axle 22 adjacent wheel 24 in (i) a first position inward of wheel 24 to operably retain wheel 24 in the outer position, and (ii) in a second position outward of wheel 24 to operably retain wheel 24 in the inner position.

In embodiments, spacer 20 is secured by a friction fit to axle 22 to resist sliding of wheel 24 in an axial direction along axle 22. Spacer 20 may be sized to hold wheel 24 in place between other components of waste receptacle 10 along axle 22, for example, relative to a hub or another portion or component of waste receptacle 10.

Spacer 20 may be formed of a single material, multiple materials, or composites or combinations thereof. For example, spacer 20 may include a polymer, a metal, an alloy, or composites or combinations thereof. In embodiments, spacer 20 includes a polyethylene, for example a low density polyethylene (LDPE) or a high density polyethylene (HDPE). Spacer 20 and embodiments of spacers are further described with reference to FIGS. 1 to 7D.

In embodiments, wheel assembly 14 further includes a washer 27. For example, washer 27 may be provided between spacer 20 and wheel 24. Washer 27 may include a polymer, a metal, an alloy, or any suitable material, or combinations thereof. Washer 27 may promote retention or alignment of wheel 24, for example, by promoting secure contact between spacer 20 and wheel 24, which may reduce loosening or wobbling of wheel 24. Multiple washers may be provided, for example, one or more washers on each side of wheel 24 along axle 29. The different washers may be substantially similar, or may different in one or more of composition, shape, geometry, or position.

In embodiments, wheel assembly 14 further includes a cap 29 at an end of wheel assembly 14 adjacent wheel 24. For example, cap 29 may be configured to resist sliding of wheel 24 off axle 22. Cap 29 may be secured to axle 22 by adhesive, weld, friction fit, overmold, press-fit, or any other suitable means or mechanism.

In embodiments, wheel 24 includes rim 26 about wheel hub 28. For example, wheel hub 28 may define an opening through which a portion of axle 22 may extend. In some such embodiments, cap 29 may be secured partly to axle 22 through wheel hub 28. In other embodiments, axle 22 may be secured to an inner portion of wheel hub 28, and cap 29 may be secured to an outer portion of wheel hub 28.

In embodiments, housing 12 defines a recess 15 adjacent wheel assembly 14. For example, recess 15 may be oriented and dimensioned such that wheel 24 is disposed in recess 15, in one or both of the inner position or the outer position of wheel 24 along axle 24. In embodiments, wheel 24 is disposed in recess 15 in the inner position along axle 24. In embodiments, wheel 24 is disposed outside recess 15 in the outer position along axle 24. Recess 15 may promote stacking or storage of waste receptacle 10, or may otherwise provide a compact profile to waste receptacle 10 as a whole. For example, wheel 24 housed in recess 15 may tend to exhibit reduced contact or interference with a user or surrounding objects or walls as opposed to a wheel that substantially extends from or substantially protrudes from housing 12.

While one wheel 24 is described, waste receptacle 10 may include two or more wheels. The wheels may be substantially similar or differ in construction and geometry. For example, one or more wheels may be provided at a rear of waste receptacle 10. Likewise, one or more wheels may be provided at a front of waste receptacle 10, with any suitable combination of presence or number of wheels at front or rear. In embodiments, wheel 24 is a first wheel, and spacer 20 is a first spacer, while wheel assembly 10 includes a second wheel secured to axle 22 and a second spacer securable to axle 22 adjacent the second wheel. In embodiments, waste receptacle 10 includes no more than two wheels.

In embodiments, waste receptacle 10 may include other components. For example, waste receptacle 10 may include a lid 11. Lid 11 may be formed of the same or similar material as that of housing 12, or a different material. Lid 11 may be securely coupled to housing 12, for example, by a hinge, or may be completely removable from housing 12. In embodiments, lid 11 may be securable to a rim of housing 12.

In embodiments, housing 12 defines an upper portion 30 defining a rim. Waste receptacle 10 may include a handle 31 adjacent or in upper portion 30. For example, handle 31 may include at least one vertical arm 32 extending from upper portion 30 to a position above the rim. In embodiments, handle 31 includes at least one horizontal bar 36 supported by the at least one vertical arm 32. In some such embodiments, at least one horizontal bar 36 is curved in a direction along the rim, as shown in FIG. 1. For example, at least one horizontal bar 36 may be concavely curved (outward) relative to the rim of waste receptacle 10. Such a raised horizontal bar 36 may promote ease of mobility and movement of waste receptacle 10, by allowing easier pushing or pulling of handle 31.

In embodiments, at least one vertical arm 32 is angled to space at least one horizontal bar 36 away from the rim in both a radial direction and a vertical direction. For example, at least one vertical arm 32 may define an angled vertex 34. In some embodiments, the at least one vertical arm 32 includes at least two, or at least three, or more vertical arms. In some embodiments, waste receptacle 10 includes three vertical arms and one horizontal bar, as shown in FIG. 1. In embodiments, waste receptacle 10 includes one or more handles 38, in addition to, or instead of, handle 31. For example, waste receptacle 10 may include two handles 38 positioned at sides of waste receptacle 10 relative to a direction of mobility of waste receptacle 10 defined by wheel assembly 14.

Figure 3A:
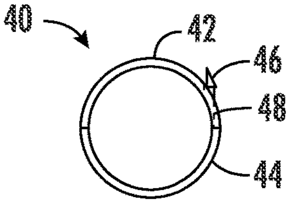
FIG. 3A is a side view of a spacer having two spacer portions in a closed configuration.
Figure 3B:
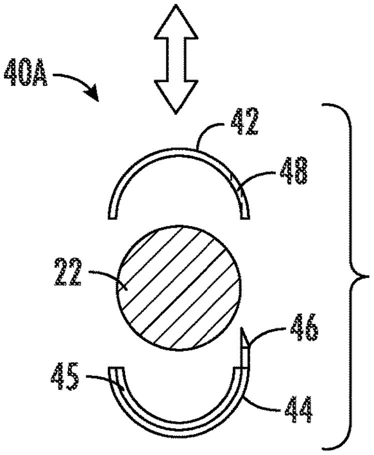
FIG. 3B is a side view of the spacer of FIG. 3A in an open configuration.

Embodiments of one or more spacers are described with reference to FIGS. 3A to 7D. FIG. 3A is a side view of a spacer 40 having two spacer portions 42 and 44 in a closed configuration. In the closed configuration, the two spacer portions 42 and 44 are removably secured to each other about axle 22 (not shown in FIG. 3A). FIG. 3B is a side view of spacer 40 of FIG. 3A in an open configuration 40A. As seen in FIG. 3B, spacer portion 42 is separated from spacer portion 44 in the open configuration, and axle 22 can be placed between spacer portions 42 and 44, ready to be secured between them, or can be removed from spacer portions 42 and 44. While two spacer portions 42 and 44 are shown, spacer 40 may include three or more spacer portions. As seen in FIG. 3B, spacer portions 42 and 44 circumferentially surround axle 22. For example, spacer 40 may completely (360°) surround axle 22 in a circumferential direction about axle 22 in the closed configuration. However, in other embodiments, spacer 40 may not completely surround axle 22, and instead, partially surround axle 22 (for example, more than 180°, more than 210°, more than 240°, more than 270°, more than 300°, or more than 330°). For example, spacer 40 may define a first spacer end (an end of spacer portion 42), a second spacer end (an end of spacer portion 44), and a spacer body extending between the first spacer end and a second spacer end in a circumferential direction around the axle, wherein the first spacer end is spaced from the second spacer end in the circumferential direction. Thus, there may be a “gap” between ends of spacer portions 42 and 44 in closed configuration 40.

Spacer portions 42 and 44 may be removably secured to each other using any suitable means or mechanism. For example, spacer portions 42 and 44 may be secured to each other by clips, tabs, openings, studs, rivets, or other components. In embodiments, a first spacer portion 42 of the two spacer portions defines at least one tab 46 and a second spacer portion 44 of the two spacer portions defines at least one opening 48 configured to removably receive tab 46 to secure first spacer portion 42 to second spacer portion 44.

In embodiments, spacer 40 may secure to axle 22 by friction fit, interference fit, or pressure, such that spacer 40 resists sliding of wheel 24 along axle 22. In embodiments, spacer 40 may be sized or dimensioned to promote retention of wheel 24 at a predetermined position along axle 22, for example, relative to another component of waste receptacle 10. In some embodiments, spacer 40 defines an inner surface facing axle 22, and the wheel assembly may include a gasket 45 between the inner surface and axle 22, as shown in FIG. 3B. Gasket 45 may partially surround axle 22, or completely surround axle 22. Gasket 45 may include a polymer, a metal, an alloy, or any other suitable material or combinations thereof. Gasket 45 may promote the securement of spacer 40 to axle 22.

While one tab and opening are described with reference to FIGS. 3A and 3B, spacers according to the present disclosure may include more than one tab and opening. The number of tabs and openings may be the same or different.

Figure 4:
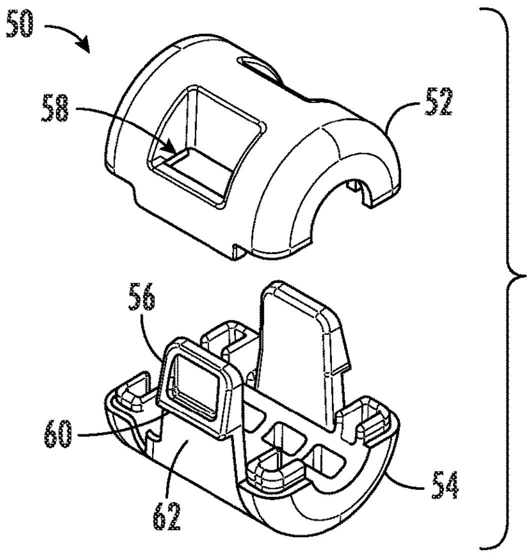
FIG. 4 is a perspective view of a spacer having two spacer portions defining a tab and an opening in an open configuration.

FIG. 4 is a perspective view of a spacer 50 having two spacer portions 52 and 54 defining at least one tab 56 and at least one opening 58 in an open configuration. As seen in FIG. 4, in some embodiments, at least one tab 56 includes two tabs, and at least one opening 58 includes two openings. In some embodiments, spacer portion 52 defines exactly two tabs, and spacer portion 54 defines exactly two corresponding openings. As shown in FIG. 4, one of spacer portions 52 and 54 may define one or more tabs and the other of spacer portions 52 or 54 may define one or more openings. In other embodiments, spacer portion 52 may define at least one tab and at least one opening that fits with a corresponding at least one opening and at least one tab defined by spacer portion 54. Thus, in some embodiments, both spacer portions 52 and 54 may define at least one tab and at least one opening complementary to each other.

In embodiments, tab 56 includes a notched tip 60 adjacent a tab wall 62. Notched tip 60 may promote retention of tab 56 through opening 58 of spacer portion 52, and ultimately promote retention of spacer 50 and wheel 24 in a predetermined position. For example, notched tip 60 may resist a pulling force that tends to separate spacer portions 52 and 54. At the same time, a user can press notched tip 60 in a direction transverse to opening 58 to permit release of notched tip 60 and tab wall 62 through opening 58 for separating spacer portions 52 and 54 from each other. As seen in FIG. 4, spacer portions 52 and 54 define a substantially circular cross-sectional opening that receives and fits axle 22 (not shown in FIG. 4).

Figure 5A:
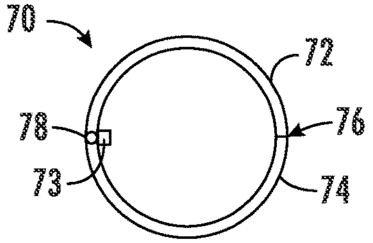
FIG. 5A is a side view of a spacer having two spacer portions coupled by a hinge in a closed configuration.
Figure 5B:
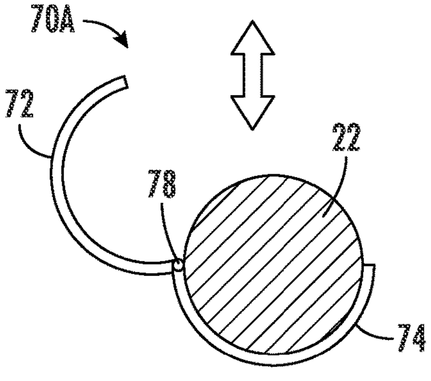
FIG. 5B is a side view of the spacer of FIG. 5A in an open configuration.

FIG. 5A is a side view of a spacer 70 having two spacer portions 72 and 74 coupled by a hinge 78 in a closed configuration. FIG. 5B is a side view of spacer 70 of FIG. 5A in an open configuration 70A. Hinge 78 may be formed of the same or similar material as spacer 70, or a different material, for example, a polymer, a metal, an alloy, or any suitable material or combination thereof. Hinge 78 may retain spacer 70 in one piece while still permitting separation from or securing to axle 22, which may be ergonomically advantageous in handling spacer 70.

In embodiments, spacer 70 may include a biasing element 73 configured to bias spacer 70 to surround axle 22. For example, biasing element 73 may bias spacer portions 72 and 74 to tend to remain in closed configuration 70 or move to closed configuration 70 from open configuration 70A. Biasing element 73 may include a spring, a strip, a tensile element, a compressive element, or combinations thereof.

Figure 6A:
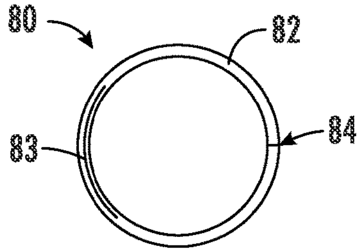
FIG. 6A is a side view of a spacer having an integral spacer body in a closed configuration.
Figure 6B:
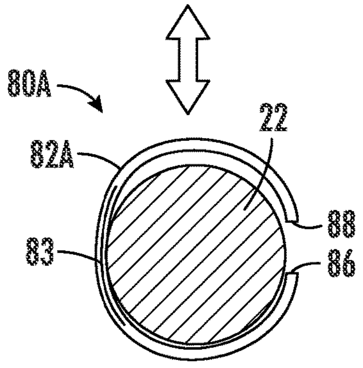
FIG. 6B is a side view of the spacer of FIG. 6A in an open configuration.

FIG. 6A is a side view of spacer 80 having an integral spacer body 82 in a closed configuration. FIG. 6B is a side view of spacer 80 of FIG. 6A in an open configuration 80A. Integral spacer body 82 may be molded, extruded, machined, stamped, additively manufactured, or otherwise formed in one piece or as a unitary structure, and may include a polymer, a metal, an alloy, or combinations thereof. Integral spacer body 82 may itself be biased to securely surround the axle, for example, partially or completely surround the axle. Integral spacer body 82 may define a slit or opening 84, and a tool or finger be inserted at slit or opening 84 to force spacer 80 to the open configuration 80A shown in FIG. 6B. Because of the biasing, the spacer will tend to transition from open configuration 80A to closed configuration 80 upon removal of force or pressure. In embodiments, instead of, or in addition to, intrinsic biasing by the material or matrix of integral spacer body 82 itself, spacer 80 may include a biasing element 83 configured to bias spacer 80 to surround axle 22. Biasing element 83 may also promote securement of spacer 80 to axle 22 against inadvertent removal, for example, in response to shocks or jerks from external contact.

While embodiments of spacers are described with reference to FIGS. 3A to 6B, various elements of these embodiments may be combined. For example, any of spacers 20, 40, 50, 70, 80, or any spacer according to the present disclosure may include one or more gasket, hinge, biasing element, tabs, openings, or portions described in the present disclosure.

Removal and securing of spacers according to the disclosure and movement of wheels from an inner position to an outer position are described with reference to FIGS. 7A to 7D. While spacer 20 is shown and described with reference to FIGS. 7A to 7D, spacer 40, 50, 60, 70, 80, or any other spacer according to the disclosure, may be used in a similar manner.

Figure 7A:
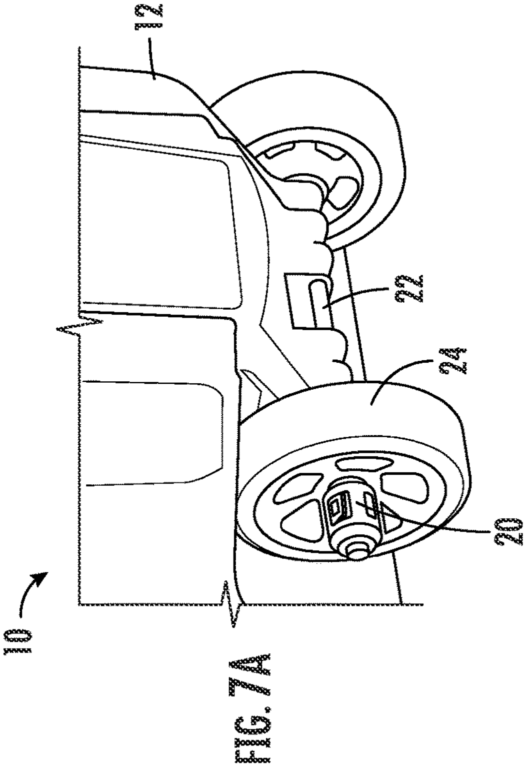
FIG. 7A is a partial rear view of the waste receptacle of FIG. 1 with the spacer in a second position outward of the wheel and the wheel operably retained in an inner position.

FIG. 7A is a partial rear view of waste receptacle 10 of FIG. 1 with spacer 20 in a second position outward of wheel 24 and wheel 24 operably retained in an inner position. For example, wheel 24 is closer to hub 16, or to a central axis of waste receptacle 10, in the inner position shown in FIG. 7A than in an outer position. The inner position of wheel 24 may promote storage and transport by reducing the overall external profile defined by waste receptacle 10, and may permit nesting of multiple waste receptacles. At the same time, wheel 24 may still be operable/rotatable in the inner position, such that receptacle 10 may be moved without having to move wheel 24 to an outer position.

Figure 7B:
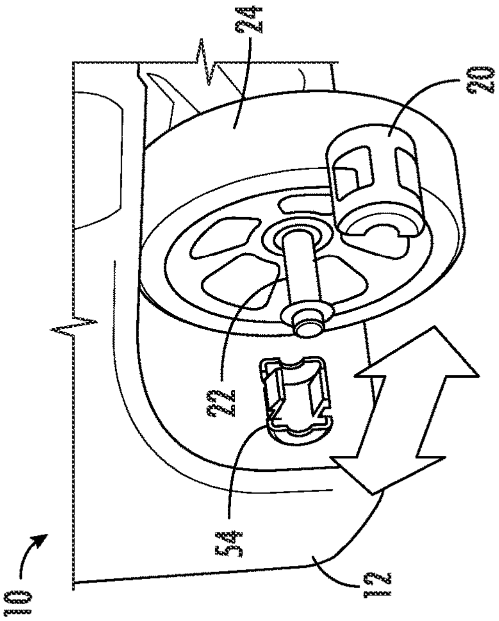
FIG. 7B is a partial rear view of the waste receptacle of FIG. 7A with the spacer removed in an open configuration to allow a transition from the second position to the first position.

FIG. 7B is a partial rear view of waste receptacle 10 of FIG. 7A with spacer 20 removed in an open configuration to allow a transition from the second position of spacer 20 to the first position of spacer 20, relative to wheel 24 along axle 22. Because spacer 20 is removed, wheel 24 can be slid outward along axle 22, to move wheel 24 from the inner position of FIG. 7B to the outer position of FIG. 7C.

Figure 7C:
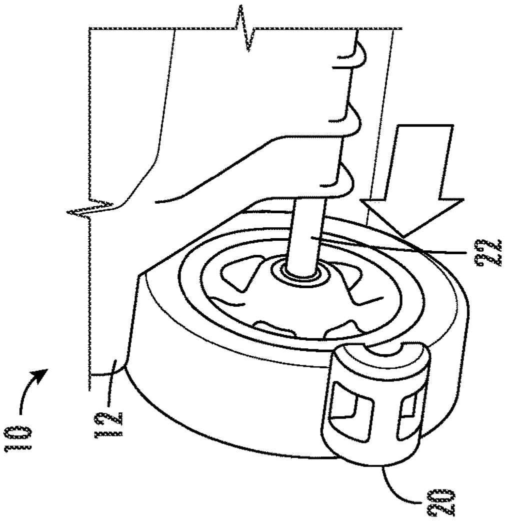
FIG. 7C is a partial rear view of the waste receptacle of FIG. 7B with the wheel moved to the outer position and the spacer ready to be secured to the axle in a first position inward of the wheel.
Figure 7D:
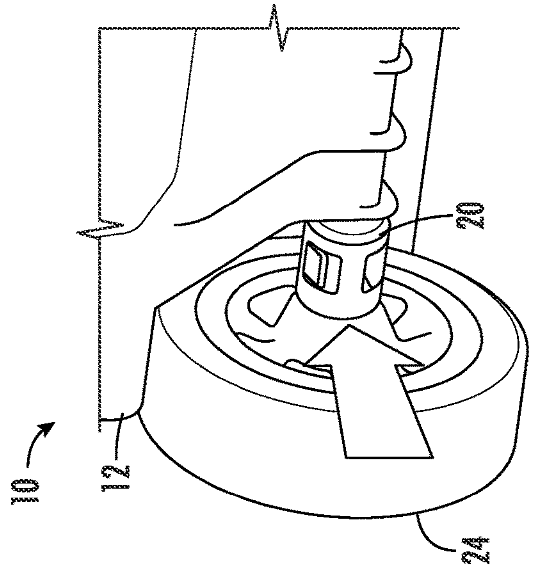
FIG. 7D is a partial rear view of the waste receptacle of FIG. 7C with the spacer secured to the axle in the first position to operably retain the wheel in the outer position.

FIG. 7C is a partial rear view of waste receptacle 10 of FIG. 7B with wheel 24 moved to the outer position and spacer 20 ready to be secured to axle 22 in a first position inward of wheel 24. FIG. 7D is a partial rear view of waste receptacle 10 of FIG. 7C with spacer 20 secured to axle 22 in the first position to operably retain wheel 24 in the outer position. While waste receptacle 10 may be movable with wheel 24 in the inner position, retaining wheel 24 in the outer position may promote stability of waste receptacle 10 during use or individual storage (e.g., after removing from a stacked assembly of waste receptacles).

Thus, spacer 20 may be used to retain wheel 24 in an inner position or in an outer position, and which may promote efficiency of storage, transportation, and subsequent use.

Figure 8:
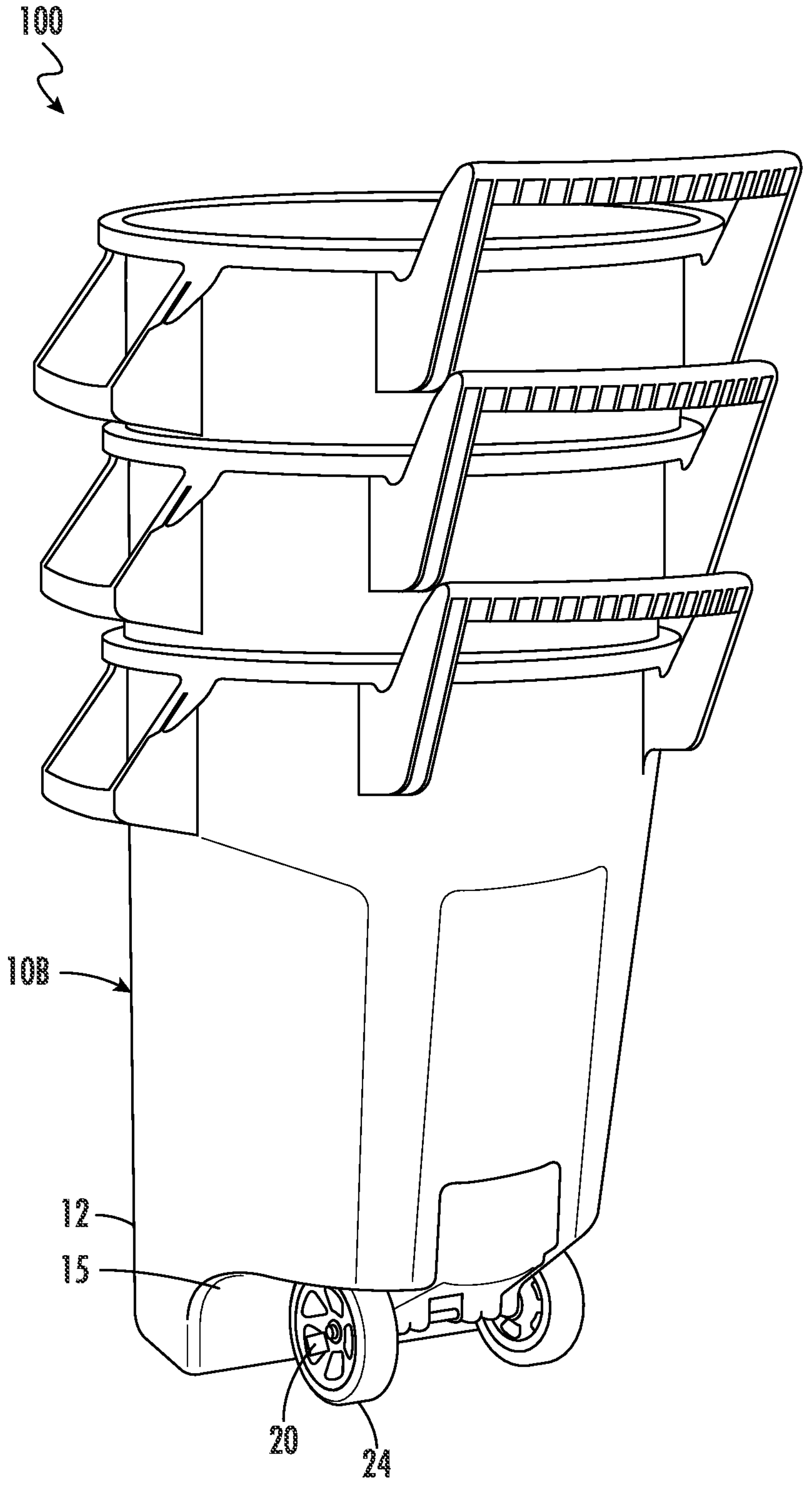
FIG. 8 is a perspective view of a stacked assembly of waste receptacles including the waste receptacle of FIG. 1.

FIG. 8 is a perspective view of a stacked assembly 100 of waste receptacles including waste receptacle 10 of FIG. 1. As seen in FIG. 8, spacer 20 is in the second position outward of wheel 24 to retain wheel 24 in the inner position, with other waste receptacles in assembly 100 being similarly configured. Such a configuration permits efficient stacking of waste receptacle 10 with other receptacles in assembly 100. Thus, waste receptacle 10 may be a first waste receptacle, and the first waste receptacle is stackable within a second waste receptacle with wheel 24 in the inner position.

Stacking or nesting of multiple waste receptacles into each other for storage or transport may reduce the overall volume occupied by multiple waste receptacles. Further, providing recess 15 may promote stacking in combination with the inner position of the wheel. For example, no portion of wheel 24 may extend from waste receptacle 10 in a manner relative to housing walls of respective adjacent nested receptacles to constrain or prevent adjacent housing walls sliding past each other. Alternatively, there may be minimal or reduced contact between wheel 24 and adjacent housing walls that still permits sufficient relative movement of adjacent receptacles in assembly 100 to permit nesting or stacking and de-nesting or de-stacking.

While the present disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A waste receptacle comprising:

a housing; and a wheel assembly coupled to the housing, the wheel assembly comprising:

an axle, a wheel secured to the axle and slidable along the axle between an outer position and an inner position, a spacer, wherein the spacer is removably securable to the axle adjacent the wheel in (i) a first position inward of the wheel to operably retain the wheel in the outer position, and (ii) in a second position outward of the wheel to operably retain the wheel in the inner position, and wherein the spacer comprises a first spacer portion and a second spacer portion that is removably secured to the first spacer portion, and wherein the axle is disposed between the first spacer portion and the second spacer portion, and at least one tab defined by the first spacer portion and at least one opening defined by the second portion, wherein the at least one opening extends through an outer surface of the second portion and is configured to receive the tab to secure the first spacer portion to the second spacer portion;

wherein the at least one tab comprises a notched tip.

2. The waste receptacle of claim 1, wherein the spacer is secured by a friction fit to the axle to resist sliding of the wheel in an axial direction along the axle.

3. The waste receptacle of claim 1, wherein the spacer completely surrounds the axle in a circumferential direction about the axle.

4. The waste receptacle of claim 1, wherein the spacer defines a first spacer end, a second spacer end, and a spacer body extending between the first spacer end and the second spacer end in a circumferential direction around the axle, wherein the first spacer end is spaced from the second spacer end in the circumferential direction.

5. The waste receptacle of claim 1, wherein the spacer comprises a hinge coupling the two spacer portions.

6. The waste receptacle of claim 1, wherein the at least one tab comprises two tabs, and where in the at least one opening comprises two openings.

7. The waste receptacle of claim 1, wherein the spacer comprises an integral spacer body biased to securely surround the axle, wherein the spacer is removable from the axle.

8. The waste receptacle of claim 1, wherein the spacer comprises a biasing element configured to bias the spacer to surround the axle.

9. The waste receptacle of claim 1, wherein the spacer comprises a polymer, a metal, an alloy, or combinations thereof.

10. The waste receptacle of claim 1, wherein:

the spacer defines an inner surface facing the axle, and the wheel assembly comprises a gasket between the inner surface and the axle.

11. The waste receptacle of claim 1, wherein:

the wheel assembly further comprises a cap at an end of the wheel assembly adjacent the wheel, and the cap is configured to resist sliding of the wheel off the axle.

12. The waste receptacle of claim 1, wherein:

the housing defines a recess adjacent the wheel assembly, and the wheel is positioned in the recess in the inner position.

13. The waste receptacle of claim 1, wherein:

the wheel is a first wheel, the spacer is a first spacer, and the wheel assembly further comprises a second wheel secured to the axle and a second spacer securable to the axle adjacent the second wheel.

14. The waste receptacle of claim 1, wherein:

the housing defines a hub defining an axle opening, and the axle opening receives the axle of the wheel assembly to secure the wheel assembly to the housing.

15. The waste receptacle of claim 1, wherein:

the waste receptacle is a first waste receptacle, and the first waste receptacle is stackable within a second waste receptacle with the wheel in the inner position.

16. The waste receptacle of claim 1, wherein:

the housing further comprises an upper portion defining a rim, the waste receptacle comprises a handle adjacent the upper portion, the handle comprises at least one vertical arm extending from the upper portion to a position above the rim, and the handle comprises at least one horizontal bar supported by the at least one vertical arm.

17. The waste receptacle of claim 16, wherein the at least one horizontal bar is curved in a direction along the rim.

18. The waste receptacle of claim 16, wherein the at least one vertical arm is angled to space the at least one horizontal bar away from the rim in both a radial direction and a vertical direction.

* * * * *